(12) United States Patent
Sakai et al.

(10) Patent No.: US 8,874,702 B2
(45) Date of Patent: Oct. 28, 2014

(54) NETWORK APPARATUS, COMMUNICATION CONTROL METHOD, AND RECORDING MEDIUM

(75) Inventors: Daisuke Sakai, Tokyo (JP); Kengo Matsuyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 140 days.

(21) Appl. No.: 12/959,896

(22) Filed: Dec. 3, 2010

(65) Prior Publication Data

US 2011/0145375 A1   Jun. 16, 2011

(30) Foreign Application Priority Data

Dec. 10, 2009  (JP) ................................. 2009-280825

(51) Int. Cl.
*G06F 15/177*   (2006.01)
*H04L 29/06*   (2006.01)

(52) U.S. Cl.
CPC ..................................... *H04L 63/02* (2013.01)
USPC ........... 709/220; 709/201; 709/202; 709/245; 709/246; 709/223

(58) Field of Classification Search
USPC .................. 709/201, 202, 223, 220, 245, 246
See application file for complete search history.

(56) References Cited

U.S. PATENT DOCUMENTS

| | | | |
|---|---|---|---|
| 6,457,059 B1 * | 9/2002 | Kobayashi ..................... | 709/242 |
| 2005/0122973 A1 * | 6/2005 | Kim et al. ..................... | 370/389 |
| 2006/0215638 A1 | 9/2006 | Abe | |
| 2009/0313118 A1 * | 12/2009 | Akiyoshi ................... | 705/14.49 |
| 2010/0306408 A1 * | 12/2010 | Greenberg et al. ........... | 709/238 |

FOREIGN PATENT DOCUMENTS

| | | |
|---|---|---|
| JP | 2003-264570 | 9/2003 |
| JP | 2006-304263 | 11/2006 |
| JP | 4012179 | 9/2007 |
| JP | 2008-154012 | 7/2008 |

OTHER PUBLICATIONS

Japanese official action dated Sep. 3, 2013 in corresponding Japanese patent application No. 2009-280825.
"No. 9 Quarantine network, Using NAP for checking security state of PC enables remediation", Nikkei Network, Dec. 2009, vol. 116, p. 86-91, Nikkei BP, Nov. 28, 2009 (with partial English Translation).
European search report dated Oct. 26, 2012 in connection with corresponding European patent application No. 10251958.4.
Olzak, "Strengthen Data Protection with Network Access Controls", Retrieved from the Internet: URL:http://www.infosecwriters.com/text_resources/pdf/Network_Access_Controls_TOlzak.pdf, May 2006.

* cited by examiner

*Primary Examiner* — Lan-Dai T Truong
(74) *Attorney, Agent, or Firm* — Cooper & Dunham LLP

(57) ABSTRACT

A disclosed network apparatus is capable of being connected to one of a restricted area where a communication is restricted and a non-restricted area where a communication is not restricted via a DHCP server and a network based on a DHCP address assigned by the DHCP server. The network apparatus includes a communication unit configured to carry out communications including a broadcast communication and a multicast communication, and a reporting unit configured to generate a report containing apparatus own information of the network apparatus to be sent over the network. In network apparatus, when the network apparatus is connected to the non-restricted area based on the DHCP address, the communication unit sends the report containing the apparatus own information of the network apparatus via the broadcast communication in place of the multicast communication.

9 Claims, 10 Drawing Sheets

NETWORK APPARATUS, COMMUNICATION CONTROL METHOD, AND RECORDING MEDIUM

BACKGROUND OF THE INVENTION

1. Field of the Invention

The present invention generally relates to a network apparatus, a communication control method, and a computer readable recording medium having a computer program for causing the network apparatus to execute the communication control method.

2. Description of the Related Art

A firewall is configured to block unauthorized access while permitting authorized communications, and is generally located at a boundary between a corporate internal local area network (LAN) such as a corporate network and an external network such as the Internet so that unauthorized external accesses to the corporate network are blocked. In addition, internal accesses within the corporate network may also be blocked based on a corporate security policy to provide a certain level of security within the corporate network. Such security is normally provided within the corporate network to block internal unauthorized accesses.

Currently, the following problems may arise in the corporate network. For example, a member of corporate staff who has an authorized access to the corporate network may unintentionally connect his or her authorized PC infected with a virus or a worm to the corporate network. Although the PC is authorized to connect to the corporate network but has a low security level, the PC adversely affects the entire corporate network security as the source of infection. The cause of the infection may include the connected PC in which no firewall is installed, the connected PC in which the firewall is installed but the latest update program is not applied, or the connected PC which is not managed by an administrator (e.g., the PC brought by an outsider).

Recently, a concept of network access protection (NAP) has become gradually acknowledged. The NAP is a protocol that implements a quarantine network technique. The NAP is a new platform that inspects a PC and requires the PC to be in compliance with a predetermined requirement before computer devices (PCs) are allowed to have access to the corporate network or allowed to communicate over the corporate network.

For example, all the PCs attempting to have access to the corporate network are connected to a special network region called an inspection network or the like where security levels of the PCs are inspected. The inspection network is logically separated from the corporate network. In the inspection network, whether the security level of the PC is compliant with the corporate security policy is determined. Specifically, the following contents are checked as the corporate security policy: 1) whether the PC has a personal firewall (software), 2) whether the latest pattern file is applied to the firewall, 3) whether the PC has prohibited software applications (installed), 4) whether the latest modified OS program (i.e., patch) is applied. If the PC clears all the above inspection tests, the PC is allowed to switch the connection to the corporate network.

However, if the PC does not clear all of the inspection tests, the PC is supplied with appropriate security measures, such as the application of the latest modified OS program or updating of the latest pattern file, based on the inspection result of the PC. Thereafter, whether the security level of the PC is compliant with the corporate security policy is determined again. If the security level is compliant with the corporate security policy, the PC is then finally authorized to have access to the corporate network.

Note that NAP may force the network to be compliant with the corporate security policy while restricting the communications of the PC. However, the quarantine network does not have rigorous definitions, so that various methods may be applied to implement the quarantine network. For example, Japanese Patent Application Publication No. 2008-154012 discloses NAP mechanisms applied to the quarantine network. The NAP includes mechanisms such as 802.1x, a Security Architecture for Internet Protocol (i.e., IPsec), a Virtual Private Network (VPN), and a Dynamic Host Configuration Protocol (DHCP). With the application of these mechanisms, the quarantine network may be implemented. Methods for implementing the quarantine network include a method for switching based on the personal firewall installed in each client, a method for changing IP addresses assigned to the PCs by a DHCP server, and a method for switching the connection destinations of the PCs by a gateway.

In this specification, NAP mechanisms, specifically, NAP employed mechanisms are focused on, and an implementing method of a NAP-DHCP based quarantine network is examined. That is, a method for changing the IP address of a PC assigned by the DHCP server based on the inspection result of the PC is examined. In this method, operations of the NAP DHCP are described as follows.

1) When the PC is connected to the quarantine network, the PC sends an IP address acquisition request to a NAP-enabled DHCP server. Note that the IP address acquisition request packet includes information used to determine whether the PC is a secure PC based on NAP. The information used to determine whether the PC is the secure PC includes information indicating whether the personal firewall is installed in the PC in question, information indicating whether the pattern file for detecting viruses is the latest version, and the like.

2) The NAP-enabled DHCP server receives the IP address acquisition packet and examines the security of the PC (e.g., whether the firewall is installed) based on the received IP address acquisition packet. If the PC security is verified, complete and effective address information (e.g., address, subnet mask, gateway, DNS, etc.) is assigned to the PC to thereby allow the PC to be connected to the corporate network.

3) On the other hand, if the PC security is not verified, the NAP-enabled DHCP server forcefully assigns restricted address information to the PC. Note that the assigned (restricted) address information differs from the address information assigned to the PC having no security problem. That is, the assigned restricted address information includes a restricted IP address and a subnet mask that will not allow the PC to be connected to the corporate network.

In the NAP DHCP operations, as described in the 3) above, if the PC has a security problem, the restricted address information is assigned to the PC so that the PC is unable to be logically connected to a protected non-restricted area of the corporate network. That is, the PC having the security problem is connected to the restricted area whereas the PC having no security problem is connected to the non-restricted area of the corporate network.

In the above-described network environment, the PCs within the restricted area do not have accesss to the non-restricted area of the corporate network. However, the above-described network environment may be different when multicast is performed between the restricted and non-restricted areas of the corporate network.

The multicast is a communication carried out by designating a specific group of PCs based on a class D address range (224.0.0.0 through 239.255.255.255), that is, a multicast address range. The multicast addresses are used as destination addresses only, and unicast addresses are used as sender's addresses.

Recently, PCs often include a protocol for searching using a multicast packet. Such a protocol is typically represented by "Bonjour" (Registered Trademark). If the PCs having no security problem within the non-restricted area carry out search for/report apparatuses or services via the multicast communication, the PCs having the security problem within the restricted area may receive the multicast packet. That is, if the sender's address contained in the multicast packet is referred to, the IP addresses of the PCs having no security problem within the non-restricted area may be exposed (disclosed).

Thus, if the IP addresses assigned to the non-restricted area are exposed in the NAP-DHCP based quarantine network, the constructed NAP-DHCP based quarantine network may be practically invalid. That is, if DHCP addresses of the PCs within the restricted area are changed into the IP addresses assigned to the non-restricted area, the PCs will reside within the non-restricted area and will be capable of logically accessing the non-restricted area.

Accordingly, embodiments of the present invention may provide a network apparatus, a communication control method and a computer readable recording medium having a computer program for causing the network apparatus to execute the communication control method that may solve one or more of the problems discussed above.

SUMMARY OF THE INVENTION

It is a general object of at least one embodiment of the present invention to provide a network apparatus, a communication control method, and a computer readable recording medium having a computer program for causing the network apparatus to execute the communication control method that substantially eliminate one or more problems caused by the limitations and disadvantages of the related art.

In one embodiment, there is provided a network apparatus that is capable of being connected to one of a restricted area where a communication is restricted and a non-restricted area where a communication is not restricted via a DHCP server and a network based on a DHCP address assigned by the DHCP server. The network apparatus includes a communication unit configured to carry out communications including a broadcast communication and a multicast communication; and a reporting unit configured to generate a report containing an apparatus own information of the network apparatus to be sent over the network. In the network apparatus, when the network apparatus is connected to the non-restricted area based on the DHCP address, the communication unit sends the report containing the apparatus own information of the network apparatus via the broadcast communication in place of the multicast communication.

In another embodiment, there is provided a network apparatus that is capable of being connected to one of a restricted area where a communication is restricted and a non-restricted area where a communication is not restricted via a DHCP server and a network based on a DHCP address assigned by the DHCP server. The network apparatus includes a communication unit configured to carry out communications including a broadcast communication and a multicast communication; and a searching unit configured to search for an apparatus information of an apparatus connected over the network. In the network apparatus, when the network apparatus is connected to the non-restricted area based on the DHCP address, the communication unit causes the searching unit to carry out the search for the apparatus information of the apparatus connected over the network via the broadcast communication in place of the multicast communication.

In another embodiment, there is provided a method for controlling a communication of a network apparatus that is capable of being connected to one of a restricted area where a communication is restricted and a non-restricted area where a communication is not restricted via a DHCP server and a network based on a DHCP address assigned by the DHCP server. The method includes carrying out communications including a broadcast communication and a multicast communication; and generating a report containing an apparatus own information of the network apparatus to be sent over the network. In the method, when the network apparatus is connected to the non-restricted area based on the DHCP address, the report containing the apparatus own information of the network apparatus is sent via the broadcast communication in place of the multicast communication.

In another embodiment, there is provided a non-transitory computer-readable recording medium that includes a computer program for causing a network apparatus to execute the above method for controlling the communication of the network apparatus.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.
[First Embodiment]
<Network Configuration>

Figure 1:
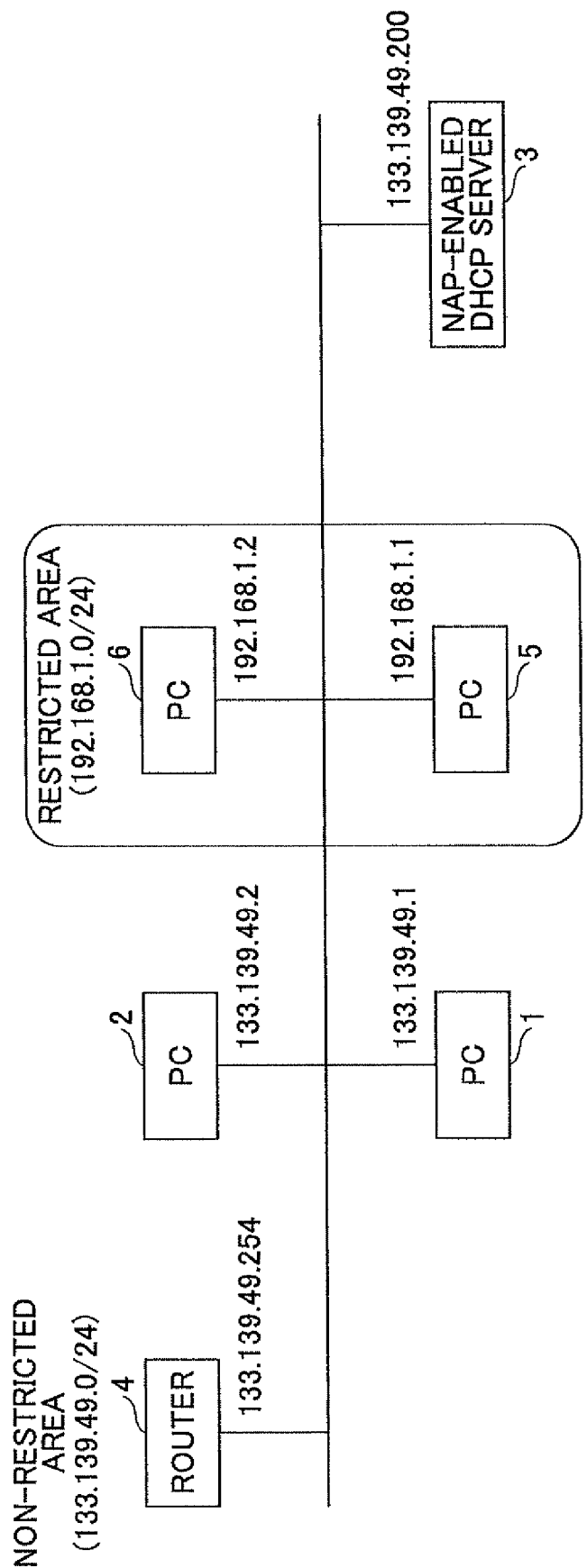
FIG. 1 is a network configuration diagram illustrating an example of a network configuration according to an embodiment.

A network configuration according to a first embodiment is described first prior to specific descriptions of the first embodiment. FIG. 1 is a network diagram illustrating an example of the network configuration according to the first embodiment. As illustrated in FIG. 1, a PC 1, a PC 2, a NAP-enabled DHCP server 3, a router 4, a PC 5, and a PC 6 are connected over a network.

Before actually connecting the PC 1 and PC 2 over the network, the NAP-enabled DHCP server 3 assigns predetermined address information to the PC 1 and PC 2. That is, when the NAP-enabled DHCP server 3 inspects (examines) security problems of the PC 1 and PC 2 and the inspection results indicate that the PC 1 and PC 2 have no security problems, predetermined non-restricted address information (IP; 133.139.49.0/24. GW; 133.139.49.254) is assigned to the PC 1 and PC 2, respectively. Thus, the PC 1 and PC 2 logically reside within the non-restricted area to have accesses to the non-restricted area and are connected outside a router 4.

The PC 5 and PC 6 are also connected over the network. However, unlike the PC 1 and PC 2, when the NAP-enabled DHCP server 3 inspects (examines) security problems of the PC 5 and PC 6 and the inspection results indicate that the PC 5 and PC 6 have security problems, predetermined restricted address information (IP; 192.168.1.0/24) is assigned to the PC 5 and PC 6. Thus, the PC 5 and PC 6 logically reside within the restricted area to have no accesses to the non-restricted area. Note that a notation such as "/24" indicates a 24 bits subnet mask that indicates "255.255.255.0" in the decimal notation.

Further, as described above, the NAP-enabled DHCP server 3 that carries out security inspections based on the NAP, and assigns the address information based on the obtained inspection result. Note that the security inspection standard or inspecting contents may optionally be determined by an administrator based on the network policy.

So far, the NAP-DHCP based quarantine network according to the first embodiment is described. As described above, in the NAP-DHCP based quarantine network, if the PC is found to have a security problem, the DHCP server assigns a predetermined DHCP address to switch the connection of the PC in question to the restricted area.

<Hardware>

Figure 2:
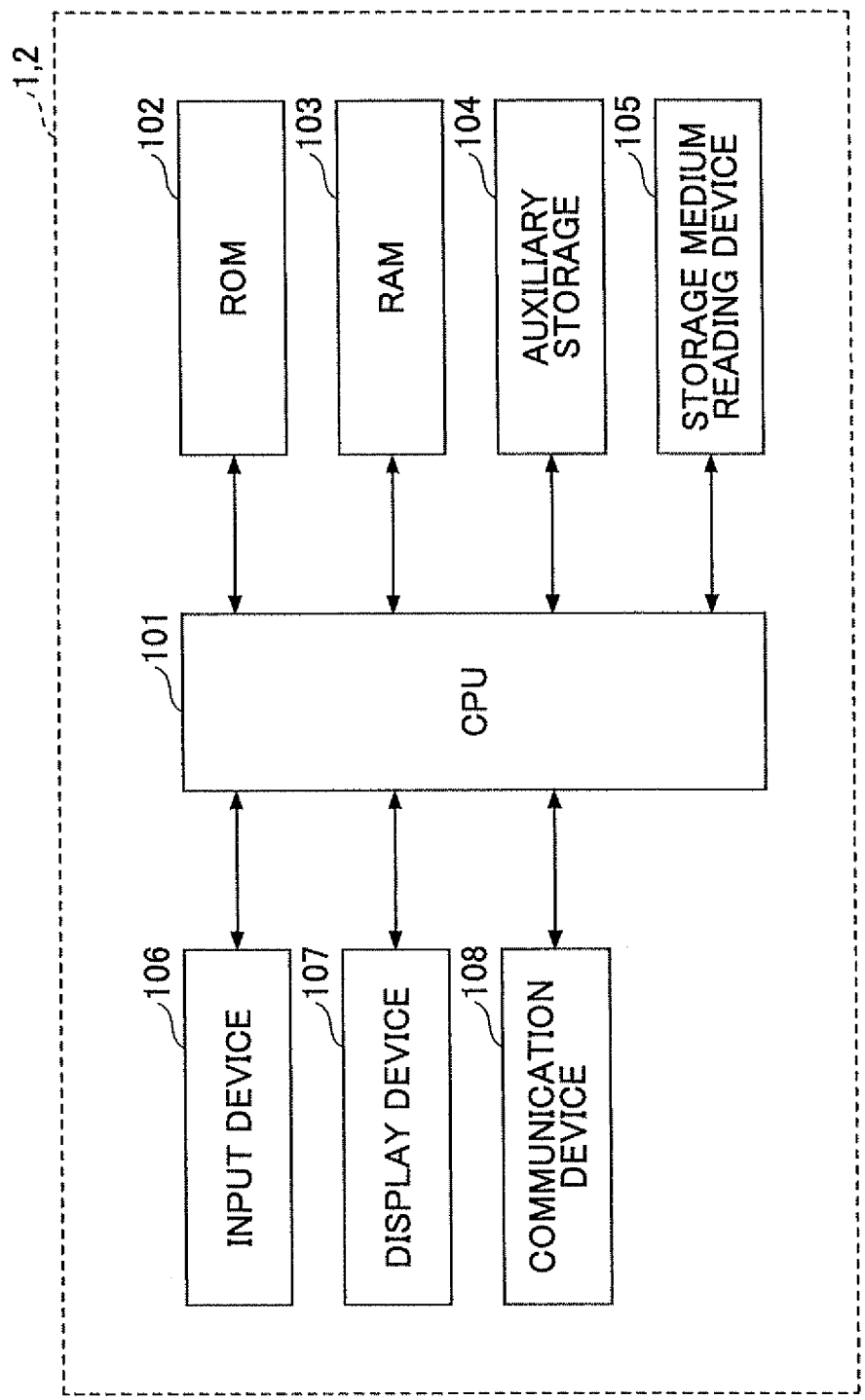
FIG. 2 is a hardware configuration diagram illustrating major components of a PC 1 according to the embodiment.

FIG. 2 is a hardware configuration diagram illustrating major components of a PC 1 according to the first embodiment. The configuration illustrated in FIG. 2 may also be applied to the PC 2, PC 5, and PC 6. The PC 1 mainly includes a CPU 101, a read only memory (ROM) 102, a random access memory (RAM) 103, an auxiliary storage 104, a storage medium reading device 105, an input device 106, a display device 107, and a communication device 108. A detailed configuration of the PC 1 is briefly described.

The CPU 101 is a circuit configured to control the entire PC 1 and includes a microprocessor and peripheral circuits of the microprocessor. The ROM 102 is a memory configured to store a predetermined control program (software component) executed by the CPU 101. The RAM 103 is utilized as a work area (work region) when the CPU 101 controls various kinds of processing by executing the predetermined control program (software component) stored in the ROM 102.

The auxiliary storage 104 is a device such as a non-volatile hard disk drive (HDD) configured to store various kinds of information including a computer program for a versatile operating system (OS), apparatus information, and registration lists (described later). Note that the various kinds of information may be stored in a compact disk-ROM (CD-ROM), a digital versatile disk (DVD) or media other than the auxiliary storage 104 and may be read via a drive device such as the storage medium reader 105. That is, the various kinds of information may optionally be read by setting the storage media in the storage medium reading device 105.

The input device 106 is utilized for a user to carry out various input operations. The input device 106 includes a mouse, a keyboard, and touch panel switches superimposed on a screen of the display device 107. The display device 107 may be formed of a liquid crystal display (LCD), a cathode ray tube (CRT), and the like. The communication device 108 is configured to communicate with apparatuses under control (not shown) and an apparatus control node 2 (not shown) connected via a network (not shown). The communication device 108 supports various types of networks including a wired network or a wireless network.

<Functionality>

Figure 3:
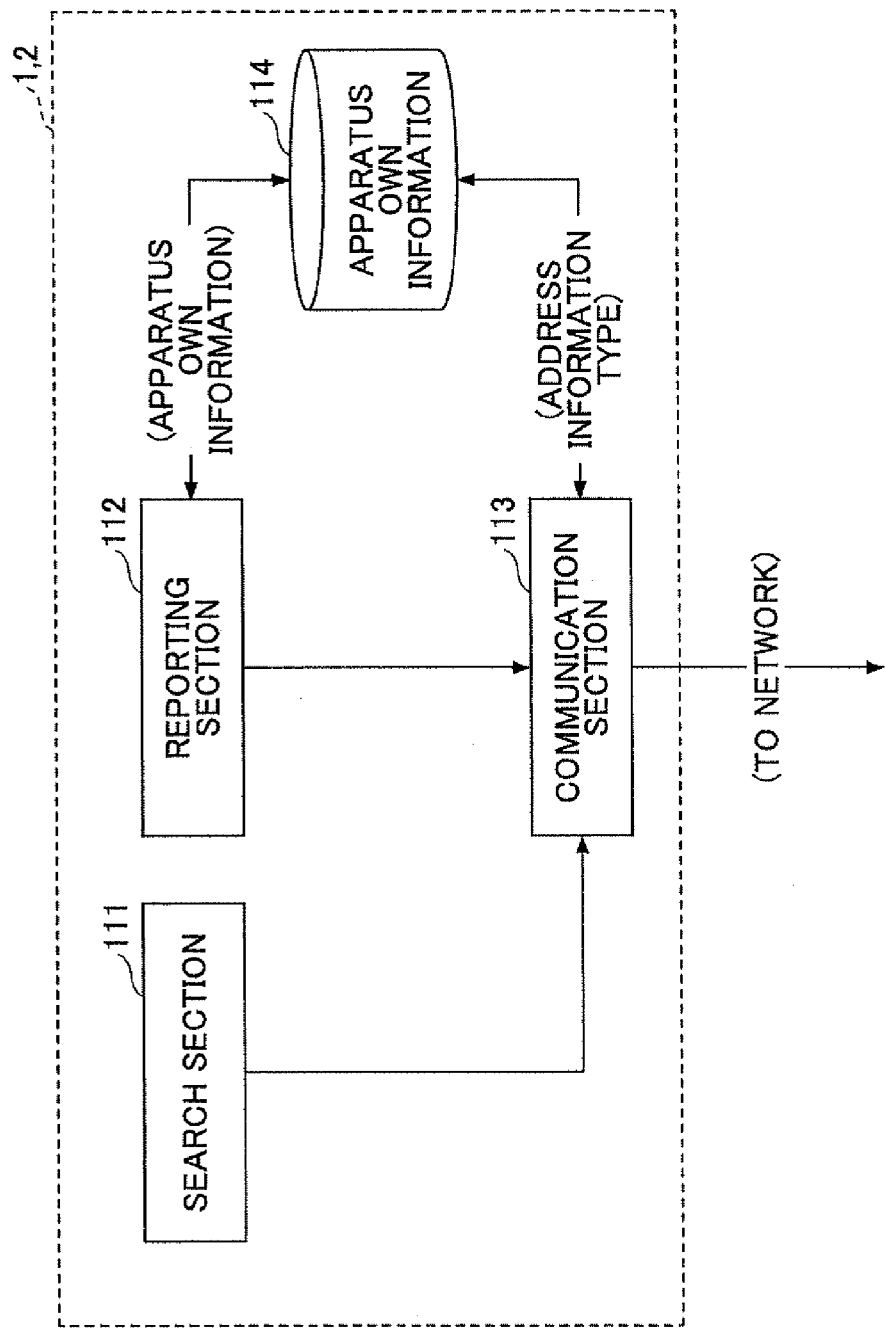
FIG. 3 is a functional block diagram illustrating major functions of the PC 1 according to the embodiment.

FIG. 3 is a functional block diagram illustrating major functions of the PC 1 (and PC 2) according to the first embodiment. The PC 1 mainly includes a search section 111, a reporting section 112, a communication section 113, and apparatus own information 114. Details of the functions are briefly described.

The search section 111 includes a function to carry out searching for apparatus information of apparatuses connected over the network. The apparatus information to be searched for may include host names, IP addresses, various services of apparatuses connected (existing) over the networks etc. That is, the search section 111 conducts so-called apparatus search or services search.

The reporting section 112 includes a function to report an apparatus own information 114 to the network. The apparatus own information 114 to be reported may include a host name, an IP address, and various services of the own apparatus. That is, the reporting section 112 reports name registration or available services of own apparatus as a search response to other apparatuses.

The communication section 113 carries out communications including broadcast and multicast communications. When the own apparatus is connected to a non-restricted area, the communication section 113 sends apparatus information searching packets and reporting packets of the apparatus own information 114 via the broadcast communication in place of the multicast communication.

The apparatus own information 114 is information on own apparatus stored in a storage unit. The apparatus own information 114 may include a host name, address information (IP address, subnet mask, gateway, DNS, etc.) and various services available in the own apparatus.

Note that the various services available in the own apparatus include various functions that one apparatus can provide to other apparatuses over the network. That is, each of the apparatuses has a specific role and provides appropriate functions based on the role to other apparatuses over the network. For example, a printer apparatus provides a printing function to other client apparatuses over the network. The client apparatuses connected over the network search for the printer apparatus that provides a printing service over the network (i.e., searching for apparatus information), and the client apparatuses can use the printing service provided by the printer apparatus on receiving a response from the printer apparatus (i.e., reporting apparatus own information 114 of the printer apparatus). Conversely, when the printer apparatus is connected over the network, the printer apparatus reports to the client apparatuses connected over the network that the printer apparatus provides the printing service (i.e., reporting apparatus own information 114). The client apparatuses can use the printing service provided by the printer apparatus on receiving that report (i.e., apparatus own information 114 of the printer apparatus) from the printer apparatus.

The aforementioned functions are implemented by the CPU 101 of a computer that executes a computer program of the functions.

<Operation>

(Reporting of Apparatus Own Information)

Figure 4:
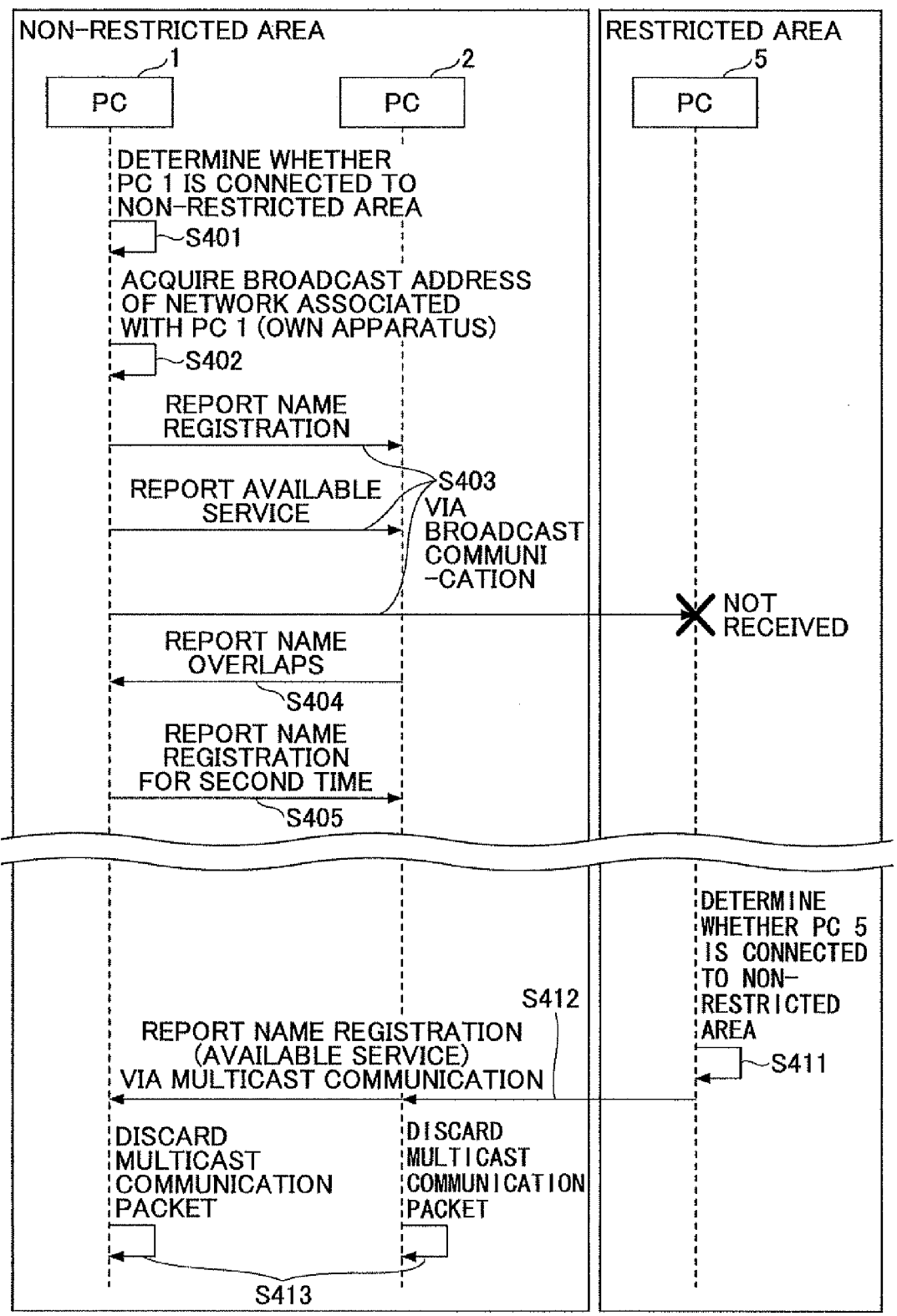
FIG. 4 is a sequence diagram illustrating an example of a reporting process to report apparatus own information over a network.

Next, a reporting process of the apparatus own information carried out by the PC 1 residing within the non-restricted area is described. FIG. 4 is a sequence diagram illustrating an example of the reporting process to report the apparatus own information over the network. As illustrated in FIG. 4, the PC 1 and PC 2 reside within the non-restricted area and the PC 5 resides in the restricted area. A detailed reporting process is briefly described.

The PC 1 determines whether the PC 1 itself (own apparatus) is connected to the non-restricted area (step S401). That is, since the NAP-enabled DHCP server 3 inspects (examines) security of the PC 1 and the inspection results indicates that the PC 1 has no security problem, predetermined non-restricted address information (IP; 133.139.49.1/24. GW; 133.139.49.254) is assigned to the PC 1. Accordingly, the PC 1 logically resides within the non-restricted area. Note that whether a PC is connected to the non-restricted area may be determined by acquiring the predetermined address information (IP; 133.139.49.xxx/24) assigned to the PC, or flag information indicating that the PC resides in the non-restricted area.

Next, the PC 1 (the reporting section 112) reports apparatus own information (e.g., name registration or available service). That is, the PC 1 reports a name of the own apparatus (PC 1) or a service provided by the own apparatus (PC 1) to the PC 2 over the network. When the apparatus own information of the PC 1 is reported to the PC 2, the PC 2 is allowed to use the service contained in the apparatus own information of the PC 1. More specifically, if the PC 1 is a printer apparatus, the PC 2 is allowed to user the printing service provided by the PC 1.

When the reporting section 112 of the PC 1 generates a reporting packet containing the apparatus own information, the communication section 113 of the PC 1 acquires a broadcast address of the network associated with the PC 1 (step S402) and sends the reporting packet containing name registration report or available service report via a broadcast communication (step S403). The communication section 113 of the PC 1 refers to the apparatus own information 114 to acquire information on the broadcast address of the network for sending the reporting packet. Specifically, the communication section 113 sends the reporting packet by designating address information "133.139.49.255" as a destination address for delivering the reporting packet. In this manner, the reporting packet is sent to an apparatus residing within the non-restricted area but is not sent to an apparatus within the restricted area (e.g., PC 5). That is, since the address of the PC 5 is "192.168.1.1", the PC 5 will not logically receive the reporting packet.

In the related art example, since the PC 1 sends the reporting packet via the multicast communication, the PC 5 may be able to receive the reporting packet. That is, when the PC 5 receives the reporting packet from the PC1 and refers to an address of a sender (PC 1) of the reporting packet, the PC 5 may identify an address "133.139.49.1" of the PC 1. If the PC 5 then changes the setting of the address of the own apparatus (PC 5) to "133.139.49.xxx" to become compliant with a network system within the non-restricted area, the PC 5 becomes able to access the non-restricted area. That is, if such a setting change is allowed, the quarantine network may become practically invalid.

Thus, in the first embodiment, the PC 1 sends the reporting packet via the broadcast communication in place of the multicast communication so that the destination (destination of receiver) that receives the reporting packet is limited to be within the non-restricted area. With this configuration, the apparatus report and service report may be appropriately sent while utilizing effectiveness of the NAP DHCP.

In some cases, when the PC 1 sends the reporting packet containing the name registration report or the available service report, the PC 1 may receive a name overlap report indicating that there is an overlapped name with the reported name from the PC 2 (step S404). When the PC 2 receives the reporting packet, the PC 2 registers apparatus or service contained in the received packet in the apparatus list of the apparatus own information 114. However, if the received name of the apparatus is identical to the name of the own apparatus (i.e., PC 2), or the received apparatus name is already registered in the apparatus list of an apparatus own information 114 of the PC 2, the PC 2 sends an overlap report indicating that the apparatus name of the PC 2 is overlapped with an apparatus name of another apparatus connected over the network as a response to the PC 1. If there are overlapped names, two or more different apparatuses having overlapped names are registered in the apparatus list. In this case, the destination to which the reporting packet is sent may not be identified or the apparatus to be accessed may not be identified.

Thus, when the PC 1 receives the name overlap report, the reporting section 112 of the PC 1 changes the overlapped name of the apparatus (i.e., PC 1) to another name to generate a new reporting packet containing a new apparatus own information of the PC 1 (including changed name). Thereafter, the communication section 113 of the PC 1 acquires a broadcast address of the network associated with the PC 1 and sends the reporting packet containing a name registration report via the broadcast communication (step S405).

As described above, if the reported apparatus own information of the PC 1 is already registered or already used by another apparatus over the network, the overlapped information is changed, and a reporting packet containing the changed apparatus own information is sent via the broadcast communication for the second time. Thus, the apparatus own information may be changed while the destination (destination of receiver) that receives the reporting packet is still limited to be within the non-restricted area. Note that if the PC 1 receives the name overlap report again for the third time, the same process may be repeated where the name of the own apparatus is changed and the reporting packet containing the name registration report having the changed name is sent via the broadcast communication again.

Next, a reporting process in which the PC 5 residing within the restricted area reports apparatus own information (e.g., name registration or available service) is described. When the NAP-enabled DHCP server 3 inspects (examines) security of the PC 5, the inspection results indicates that the PC 5 has a security problem. As a result, predetermined non-restricted address information (IP; 192.168.1.1/24) is assigned to the PC 5. Thus, the PC 5 logically resides within the restricted area so that the PC 5 does not have access to the non-restricted area.

The PC 5 determines whether the PC 5 itself (own apparatus) is connected to the non-restricted area (step S411). In this case, since the PC 5 logically resides within the restricted area, it is determined that the PC 5 is connected to the restricted area. Note that if an apparatus resides within the non-restricted area, the reporting packed is sent via the broadcast communication whereas if the apparatus resides within the restricted area the reporting packet is sent via the multicast communication, based on the determination result of whether the apparatus in question is connected to the restricted or non-restricted area.

Next, the PC 5 reports apparatus own information (e.g., name registration or available service) of the PC 5. The PC 5 generates a reporting packet and sends the generated reporting packet containing a name registration report or an available service report via the multicast communication in the same manner as the related art example (step S412). Since the PC 5 sends the reporting packet via the multicast communication, the reporting packet reaches the PC 1 and PC 2 residing within the non-restricted area.

When the PC 1 (and PC 2) receives the multicast communication packet (i.e., reporting packet received via the multicast communication) from an apparatus (i.e., in this case, the PC 5) residing within the restricted area, the PC 1 (and PC 2) carries out a process of discarding the multicast communication packet (step S413). Note that whether a received communication is the multicast communication is determined based on the multicast address. Note also that whether the received communication is sent from the apparatus residing within the restricted area is determined by referring to the apparatus own information 114.

Although the PC 1 registers the reporting packet received from the apparatus residing within the restricted area in the registration list, the PC 1 will not access the apparatus (having security problem) residing within the restricted area. Further, if the PC 1 registers the reporting packet received from the apparatus residing within the restricted area in the registration list and sends a response to that apparatus residing within the restricted area, the apparatus own information of the PC 1 is reported (exposed) to the apparatus residing within the restricted area. Thus, the PC 1 according to the first embodiment is configured to discard the multicast communication packet received from the apparatus residing within the restricted area. With this configuration, the address of the PC 1 residing within the non-restricted area will not be identified or exposed to the apparatuses residing within the restricted area, and effectiveness of the NAP DHCP may be improved.

(Searching of Apparatus Information)

Figure 5:
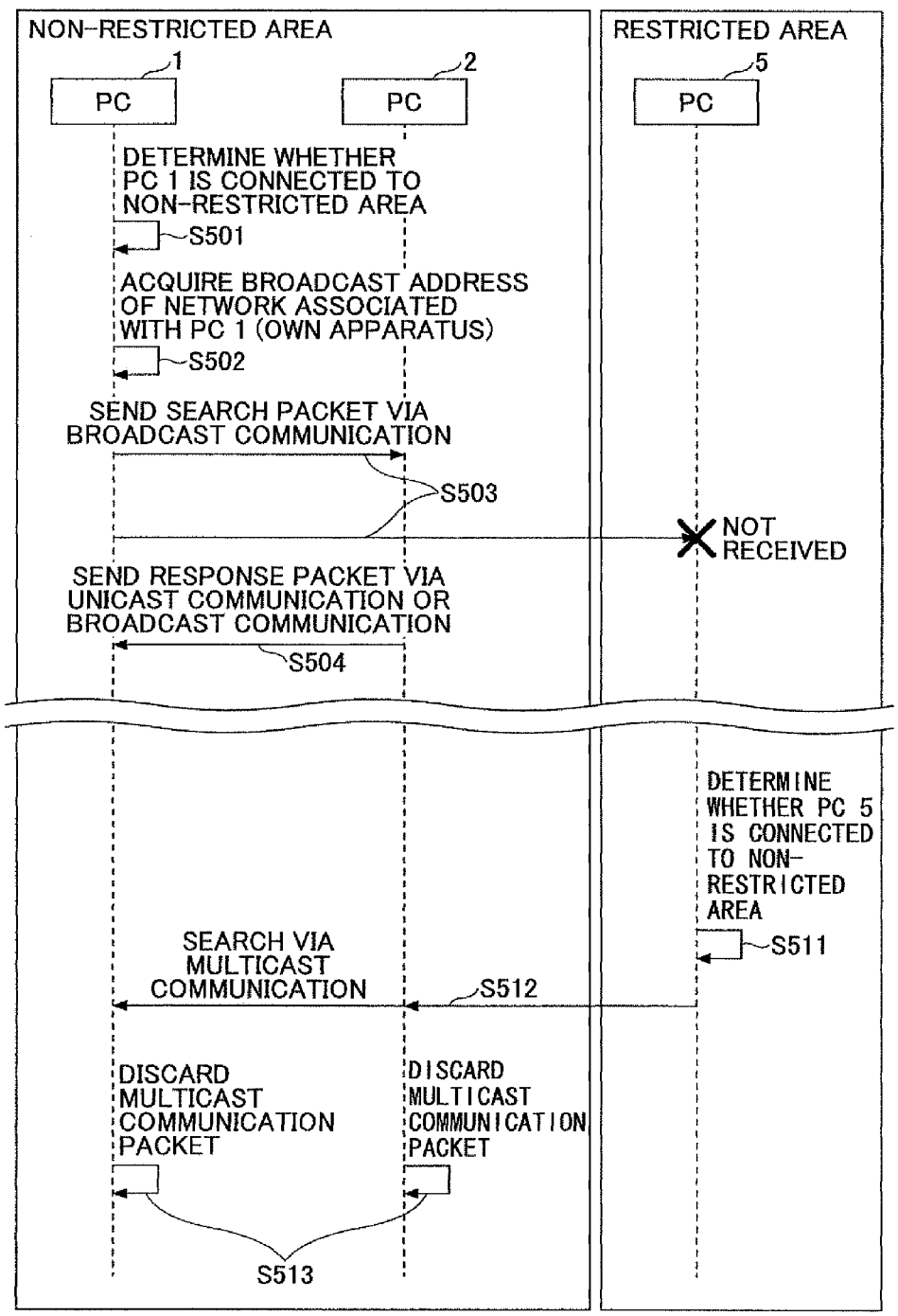
FIG. 5 is a sequence diagram illustrating a searching process to search for apparatus information of the apparatuses connected over the network.

Next, a searching process of the apparatus information carried out by the PC 1 residing within the non-restricted area is described. FIG. 5 is a sequence diagram illustrating a searching process to search for apparatus information of the apparatuses connected over the network. As illustrated in FIG. 5, the PC 1 and PC 2 reside within the non-restricted area and the PC 5 resides in the restricted area. As described above, the PC 1 sends the reporting packet containing the apparatus own information of the PC 1 via the broadcast communication. Note that the PC 1 also sends a searching packet for searching for apparatus information via the broadcast communication. A detailed searching process is briefly described.

The PC 1 determines whether the PC 5 itself (own apparatus) is connected to the non-restricted area (step S501). In this case, since the PC 1 is logically connected to the non-restricted area, it is determined that the PC 1 is connected to the non-restricted area (step S502).

Next, the PC 1 (the search section 111) searches for apparatus information (e.g., name search or available service search) over the network. That is, if the PC 1 wishes to use a service provided by another apparatus connected over the network, the PC 1 searches for an apparatus name or available service of the apparatus connected over the network. For example, the PC 1 searches for the printer apparatus that provides a printing service over the network (i.e., apparatus information search), and the PC 1 can use the printing service provided by the printer apparatus on receiving a response (i.e., apparatus own information report of the printer apparatus) from the printer apparatus.

Thereafter, when the search section 111 generates a searching packet, the communication section 113 acquires a broadcast address of the network associated with the PC 1 and sends the searching packet via the broadcast communication (step S503). The communication section 113 of the PC 1 refers to the apparatus own information 114 to acquire information on the broadcast address of the network for sending the searching packet. Specifically, the communication section 113 sends the searching packet by designating "133.139.49.255" as a destination address for sending (delivering) the searching packet. In this manner, the searching packet is received by an apparatus residing within the non-restricted area but is not received by an apparatus within the restricted area (e.g., PC 5). That is, since the address of the PC 5 is "192.168.1.1", the PC 5 will not logically receive the searching packet.

In the related art example, since the PC 1 sends the searching packet via the multicast communication, the PC 5 may be able to receive the searching packet. That is, when the PC 5 receives the searching packet sent from the PC 1 and refers to an address of a sender (PC 1) contained the searching packet, the PC 5 may identify the address "133.139.49.1" of the PC 1. As a result, the quarantine network may become practically invalid.

Thus, in the first embodiment, the PC 1 sends the searching packet via the broadcast communication in place of the multicast communication so that the destination (destination of receiver) that receives the searching packet is limited to be within the non-restricted area. With this configuration, the apparatus search and service search may be appropriately carried out while utilizing effectiveness of the NAP DHCP.

Meanwhile, when the PC 2 receives the searching packet from the PC 1, the PC 2 sends a response packet containing apparatus own information via unicast communication (or broadcast communication) (step S504).

Next, a searching process in which the PC 5 residing the restricted area searches for apparatus information is described. When the NAP-enabled DHCP server 3 inspects (examines) security of the PC 5, the inspection results indicates that the PC 5 has a security problem. As a result, predetermined non-restricted address information (IP; 192.168.1.1/24) is assigned to the PC 5. Thus, the PC 5 logically resides within the restricted area so that the PC 5 does not have access to the non-restricted area.

The PC 5 determines whether the PC 5 itself (own apparatus) is connected to the non-restricted area (step S511). In this case, since the PC 5 logically resides within the restricted area, it is determined that the PC 5 is connected to the restricted area. Note that if an apparatus resides within the non-restricted area, the searching packet is sent via the broadcast communication whereas if the apparatus resides within the restricted area the searching packet is sent via the multicast communication, based on the determination result of whether the apparatus in question is connected to the restricted or non-restricted area.

Next, the PC 5 searches for apparatus information (e.g., name search or available service) over the network. The PC 5 generates a searching packet and sends the generated searching packet via the multicast communication in the same manner as the related art example (step S512). Since the PC 5 sends the searching packet via the multicast communication, the searching packet reaches the PC 1 and PC 2 residing within the non-restricted area.

When the PC 1 (and PC 2) receives the multicast communication packet (i.e., searching packet received via the multicast communication) from the apparatus (i.e., in this case, the PC 5) residing within the restricted area, the communication section 113 (of PC 1 or PC 2) carries out a process of discarding the multicast communication packet (step S513). Note that whether a received communication is the multicast communication is determined based on the multicast address. Note also that whether the received communication is sent from the apparatus residing within the restricted area is determined by referring to the apparatus own information 114.

Further, if the PC 1 (reporting section 112) receives the searching packet sent via multicast communication from the apparatus residing within the restricted area and sends a response to that apparatus residing within the restricted area, a response packet containing the apparatus own information of the PC 1 is reported (exposed) to the apparatus residing within the restricted area. Thus, the PC 1 according to the first embodiment is configured to discard the multicast communication packet received from the apparatus (i.e., in this case, the PC 5) residing within the restricted area. With this configuration, the address of the PC 1 residing within the non-restricted area will not be identified or exposed to the apparatuses residing within the restricted area, and effectiveness of the NAP DHCP may be improved.

Note that if the PC 1 (reporting section 112) receives the searching packet via the multicast communication from another apparatus residing within the non-restricted area, the PC 1 may send a response (response packet) via the unicast communication. Note that in the first embodiment, the PC 1 residing within the non-restricted area sends the searching packet via the broadcast communication whereas another apparatus residing within the non-restricted area that sends the searching packet to the PC 1 via the multicast communication corresponds to a related art apparatus (e.g., later-described PC 7).

[Second Embodiment]

As described in the first embodiment, since the PC 1 (and PC 2) residing within the non-restricted area sends the reporting packet or the searching packet via the broadcast communication, the PC 5 (and PC 6) residing within the restricted area will not receive the reporting packet or the searching packet sent from the PC 1 (and PC 2). Accordingly, even if there are different apparatuses having overlapped (i.e., same) names, one in the non-restricted area and one in the restricted area, a name overlap report will not be generated. As a result, the overlapped names of the different apparatuses may not thus be corrected. In this case, there may be different apparatuses having overlapped names one in each of the non-restricted area and the restricted area.

However, since the PC 1 (and PC 2) according to the first embodiment residing within the non-restricted area does not carry out the multicast communication with the nodes (terminals) residing within the restricted area, overlapped apparatus names will not be registered in the apparatus list of the own apparatus (PC1 or PC 2). As a result, the PC 1 (and PC 2) will not have problems in the apparatus list that contains apparatus names and available services of the apparatuses connected over the network. That is, even if there area different apparatuses having overlapped names one in each of the non-restricted area and the restricted area, the apparatus list of the PC 1 includes only names of the apparatuses residing within the non-restricted area.

However, if an apparatus having a similar configuration as that of the related art apparatus (hereinafter, the related art apparatus is defines as the related art PC 7) resides within the non-restricted area, the related art PC 7 residing within the non-restricted area sends the reporting packet or searching packet via the multicast communication. As a result, the different apparatuses having overlapped names residing within the non-restricted area and those residing within the restricted area may be found (detected). Accordingly, an apparatus list of the PC 7 includes the different apparatuses having overlapped names one for each of the non-restricted area and the restricted area, and hence the PC 7 may not be able to carry out communication. For example, when the PC 7 wishes to use a service of one of the apparatuses having the overlapped names, the PC 7 will not be able to single out which one of the apparatuses having the overlapped names provides the desired service.

Figure 6:
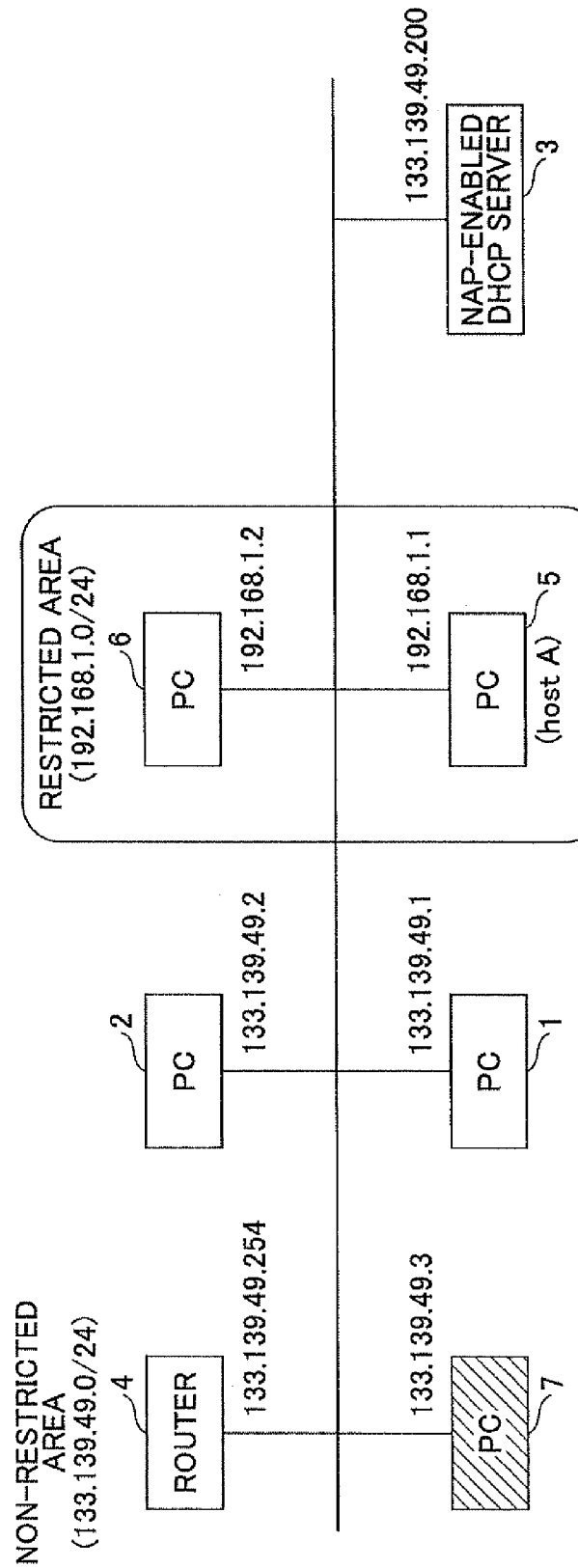
FIG. 6 is a network configuration diagram illustrating an example of a network configuration according to a second embodiment.

FIG. 6 is a network configuration diagram illustrating an example of the network configuration according to a second embodiment. As illustrated in FIG. 6, the PC 1, the PC 2, the NAP-enabled DHCP server 3, the router 4, the PC 5, and the PC 6 are connected over the network. The network configuration according to the second embodiment differs from that of the first embodiment illustrated in FIG. 1 in that the network configuration according to the second embodiment includes the related art PC 7 (133.139.49.3/24) residing within the non-restricted area (i.e., the related art PC 7 connected to the non-restricted area). Note that an apparatus name of the PC 1 is defined as a "host A" and an apparatus name of the PC 5 is defined as a "host A".

Figure 7:
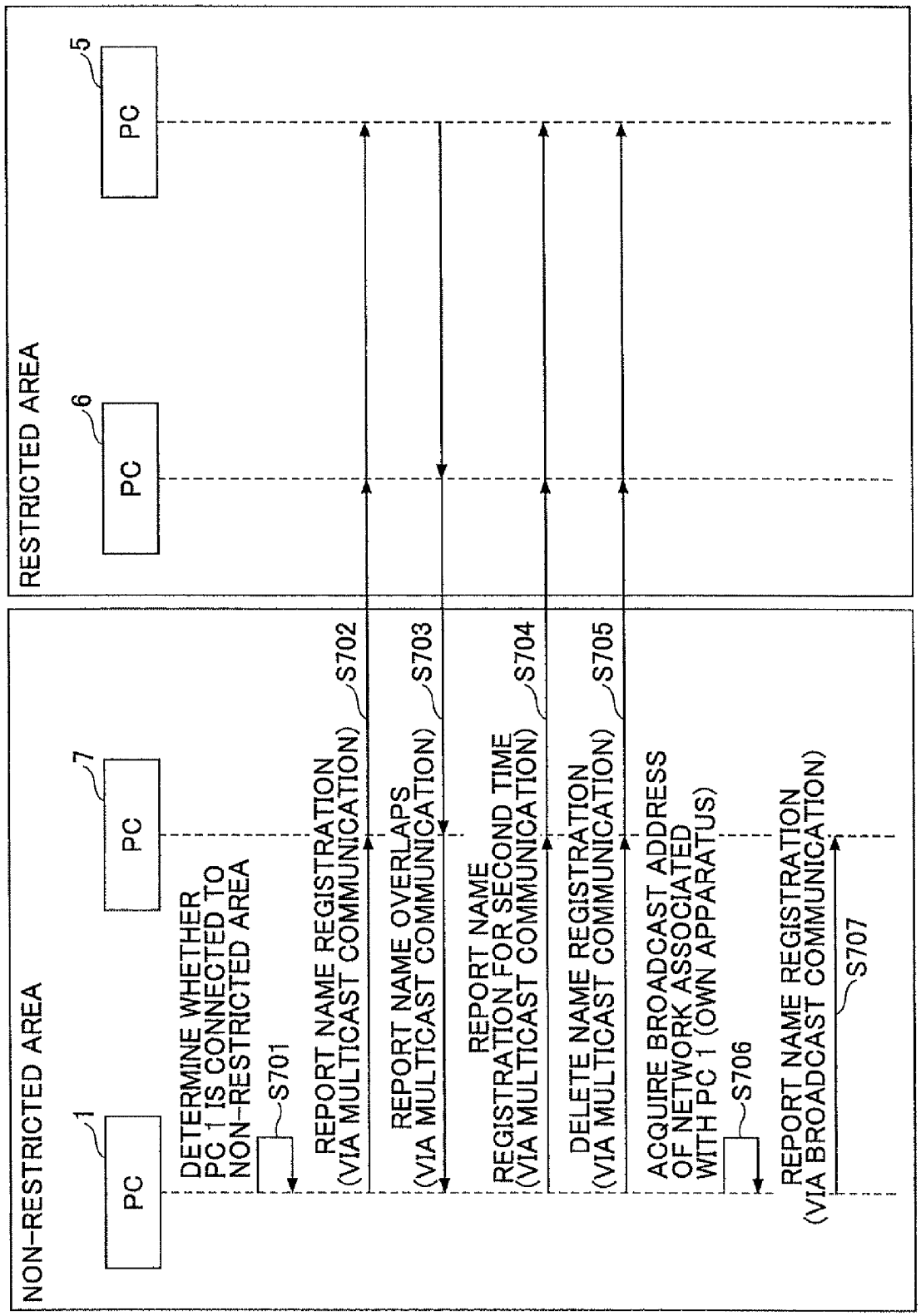
FIG. 7 is a sequence diagram illustrating another example of the reporting process to report the apparatus own information over the network.
Figure 8:
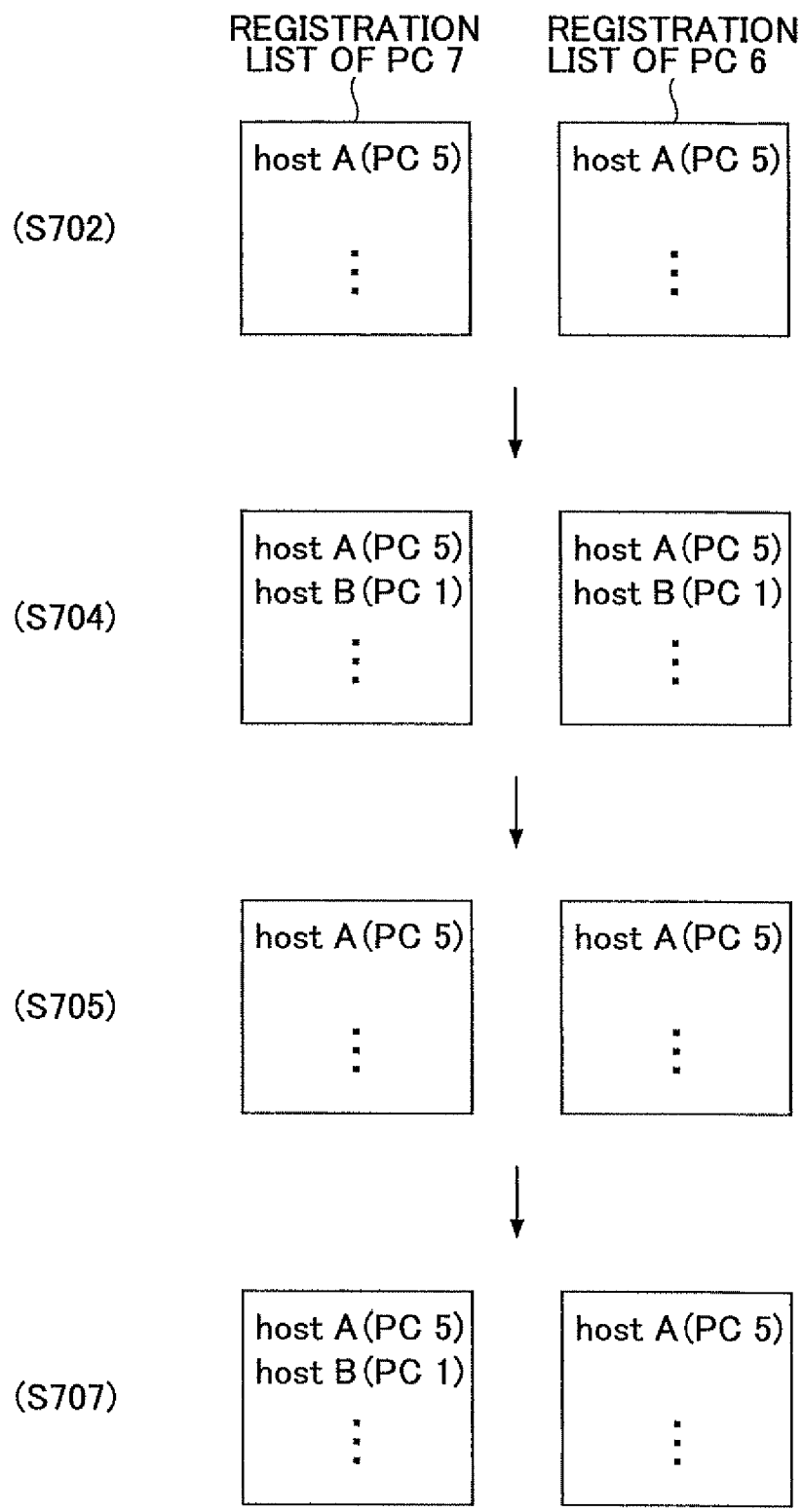
FIG. 8 is a diagram illustrating registration transitions of respective registration lists of a PC 6 and a PC 7.

FIG. 7 is a sequence diagram illustrating an example of a reporting process to report apparatus own information over the network. As illustrated in FIG. 7, the PC 1 and the PC 7 reside within the non-restricted area and the PC 5 and the PC 6 reside within the restricted area. FIG. 8 is a diagram illustrating registration transitions of respective registration lists of the PC 6 and the PC 7. A detail of the reporting process is described with reference to the FIGS. 7 and 8.

The PC 1 determines whether the PC 1 itself (own apparatus) is connected to the non-restricted area (step S701). In this case, since the PC 1 is logically connected to within the non-restricted area, it is determined that the PC 1 is connected to the non-restricted area.

When the reporting section 112 of the PC 1 generates a reporting packet containing the apparatus own information (of the PC 1) in order to determine whether the apparatus own information (e.g., name of the PC 1) overlaps apparatus information (name) of another apparatus, the communication section 113 of the PC 1 sends the reporting packet containing a name registration report via the multicast communication (step S702). Note that the reporting packet includes the name of the PC 1, namely, a "host A" as a reporter of the registration. Note also that since the PC 1 sends the reporting packet via the multicast communication, the reporting packet reaches the PC 7 residing the non-restricted area and the PC 5 and the PC 6 residing within the restricted area.

The registration lists of the PC 7 and the PC 6 in step S702 are illustrated in FIG. 8 (see S702). Since the registration lists of the PC 7 and the PC 6 each already have the name "host A", no additional name is registered in either of the registration lists of the PC 7 and the PC 6. The "host A" corresponds to the PC 5. Note that the reason that the registration list of the PC 7 already has the name "host A" is that the PC 7 has a configuration of that of the related art apparatus described above. That is, since the PC 7 is configured to send the reporting packet or searching packet via the multicast communication, the PC 7 has already found the PC 5 (i.e., the name "host A") residing within the restricted area. Likewise, the reason that the registration list of the PC 6 already has the name "host A" is that the PC 6 sends the reporting packet or searching packet via the multicast communication within the restricted area (same area as PC 6) and has found the PC 5 (the name "host A") residing within the same area (restricted area).

Since the PC 5 has the same apparatus name as the received (reported) apparatus name and apparatus names are overlapped over the network, the PC 5 sends a name overlap report to the PC 1 (step S703). When the PC 1 receives the name overlap report indicating that there is the name "host A" identical to the apparatus name of the PC 1 already (registered) used over the network, the reporting section 112 of the PC 1 changes the overlapped name of the apparatus (PC 1) to another name such as a "host B" to generate a new reporting packet containing the apparatus own information (including now the new apparatus name of "host B") of the PC 1. The communication section 113 of the PC 1 sends a reporting packet containing a name registration report for the second time via the multicast communication in order to determine whether the restricted area contains any apparatus name overlapped with the changed apparatus name (i.e., "host B") of the PC 1 (step S704). The registration lists of the PC 7 and the PC 6 in step S704 are illustrated in FIG. 8 (see S704). As illustrated FIG. 8, the registration lists of the PC 7 and the PC 6 includes the name "host B" of the PC 1 (step S704).

If the PC 1 does not receive the name overlap report in a predetermined period, the PC 1 determines that the there is no apparatus name overlapped with the changed name "host B" among the apparatuses over the network and the reporting section 112 sends a name deletion report (i.e., reporting section 112 of the PC1 deletes the name "host B") (step S705). The registration lists of the PC 7 and the PC 6 in step S705 are illustrated in FIG. 8 (see S705). As illustrated FIG. 8, the name "host B" of the PC 1 is deleted from the registration lists of the PC 7 and the PC 6 and the name "host A" of the PC 5 only remains in the registration lists of the PC 7 and the PC 6.

Note that the PC 1 (reporting section 112) deletes the name "host B" because the name registration report via the multicast communication is carried out for determining whether there is any apparatus having the name overlapped with the name of the PC 1 (e.g., "host B" in this case) within the restricted area. If the PC 1 determines whether to receive the name overlap report based on the name registration report and the PC 1 receives the overlap report, the PC 1 determines that there is an apparatus within the restricted area that has the name overlapped with the name of the PC1. If there is the apparatus having the overlapped name of the PC 1 found within the restricted area, the PC 1 changes the name of the PC 1, and registers the changed name of the PC 1 in the registration of the PC 7 having the related art configuration residing in the same non-restricted area. However, the PC 1 does not register the changed name of the PC 1 in the registration of the PC 6 residing in the restricted area because if the changed name of the PC 1 is registered in the registration list of the PC6, the address information of the PC 1 residing in the non-restricted area remains in the registration list of the PC 6 residing in the restricted area, which may result in exposing the address information of the PC 1 to the apparatuses within the restricted area.

Thereafter, the communication section 113 of the PC 1 acquires a broadcast address of the network associated with the PC 1 (step S706) and sends the reporting packet containing a name registration report having the changed name of the PC 1 via the broadcast communication (step S707). The PC 1 changes the overlapped name "host A" into the name "host B", and registers the changed name "host B" in the registration list of the related art PC 7. Note that the PC 1 sends the reporting packet via the broadcast communication in step S707 to prevent the reporting packet sent by the PC 1 from reaching the apparatuses within the restricted area. The registration lists of the PC 7 and the PC 6 in step S707 are illustrated in FIG. 8 (see S707). As illustrated FIG. 8, the registration list of the PC 7 includes both the name "host A" of the PC 5 and the name "host B" of the PC 1 whereas the registration lists of the PC 6 includes the name "host A" of the PC 5 alone. Note that the name of the PC 1 is temporarily registered in the registration list of the PC 6 while searching for the overlapped name in the restricted area so that the address information within the non-restricted area may temporarily be disclosed. However, since the address information of the PC 1 is eventually deleted from the registration list of the PC 6, the address information of the PC within the non-restricted area will not be identified. As a result, the effectiveness of the NAP DHCP may be obtained.

As described above, if the related art apparatus (e.g., PC 7) resides within the non-restricted area, such an apparatus sends the reporting packet or the searching packet via the multicast communication. That is, since the related art PC 7 sends the reporting packet or searching packet via the multicast communication, the apparatus list of the related art PC 7 includes the different apparatuses having overlapped names found one in each of the non-restricted area and the restricted area. That is, the registration list of the related art PC 7 includes two "host A" registrations. Thus, the PC 1 according to the second embodiment residing within the non-restricted area temporarily conducts the multicast communication to determine whether there is any apparatus having a name overlapped with the name of the PC 1 existed within the restricted area when sending the name registration report. If an apparatus having the same name as the PC 1 is found within the restricted area, the PC 1 changes the name of the PC 1 into another name and sends the reporting packet containing the changed name of the PC 1 via the broadcast communication. In this manner, it is possible to prevent the related art apparatus from registering the two different apparatuses having the same names (overlapped names) in the registration list of the related art apparatus.

More specifically, if the user uses a search tool of Bonjour (Registered Trademark) of the related art PC residing within the restricted area to carry out network searching, two different apparatuses (e.g., PC1 and PC 5 in the second embodiment) both having the same name "host A" are displayed. In order to avoid such a case, the user carries out a predetermined operation in the PC 1 so that the communication section 113 of the PC 1 in step S702 sends the reporting packet containing the name registration report by temporarily carrying out the multicast communication. Accordingly, the overlapped names displayed in the search tool of the related art PC 7 may be cancelled based on the above-described operation of the PC 1, and the names "host A" (PC 5) and "host B" (PC 1) are correctly displayed. Thus, if it is obvious that the different apparatuses have the same name (overlapped name) as the above case, the PC 1 may omit the determination of the overlapped name carried out in step S702, and start a subsequent process from sending the name registration report containing the changed name in step S704.

As already described in the first embodiment, when the PC 1 (and PC 2) sends, on receiving the multicast communication packet from the apparatus (e.g., PC 5) residing within the restricted area, a response to the apparatus residing within the restricted area, the apparatus own information of the PC 1 (or PC 2) is exposed or disclosed to apparatuses residing within the restricted area. Thus, if the PC 1 (and PC 2) receives the multicast communication packet from the apparatus residing within the restricted area, the PC 1 (and PC 2) carries out a process of discarding the multicast communication packet (step S413 in the first embodiment).

Accordingly, even if the apparatus (e.g., PC 5) residing within the restricted area sends the name registration report, the PC 1 will not send a name overlap report. As a result, even if there are different apparatuses having overlapped names one in each of the non-restricted area and the restricted area, the overlapped names of the different apparatuses may not be searched for or corrected. In this case, there may exist the apparatuses having the overlapped names one for each of the non-restricted area and the restricted area (in the registration list).

However, in the first embodiment, since the PC 1 (and PC 2) residing within the non-restricted area does not carry out the multicast communication with the nodes (e.g., PC 5) residing within the restricted area, the overlapped apparatus names will not be registered in the apparatus list of the own apparatus (of the PC1 or PC 2). As a result, the PC 1 (and PC 2) will not have a problem in the apparatus list that contains the apparatus names and available services of the apparatuses connected over the network. In this case, even if there are different apparatuses having overlapped names one in each of the non-restricted area and the restricted area, the apparatus list of the PC 1 only includes the names of the apparatuses residing within the non-restricted area.

However, if the related art apparatus (i.e., the PC 7) resides within the non-restricted area, the aforementioned problem may occur. That is, since the related art PC 7 is configured to send the reporting packet or searching packet via the multicast communication, the related art PC 7 will find or detect the different apparatuses having overlapped names one in each of the non-restricted area and the restricted area. Thus, the registration list of the related art PC 7 registers the overlapped names of the different apparatuses detected one in each of the non-restricted area and the restricted area.

[Modification]

In the second embodiment, the PC 1 sends the name registration report by temporarily carrying out the multicast communication to prevent the overlap problem as illustrated from the sequence diagram in FIG. 7. However, in a modification of the second embodiment, the PC 5 receives the name registration report by temporarily carrying out the multicast communication to prevent the same overlap problem. A detail of the receiving process is briefly described.

Figure 9:
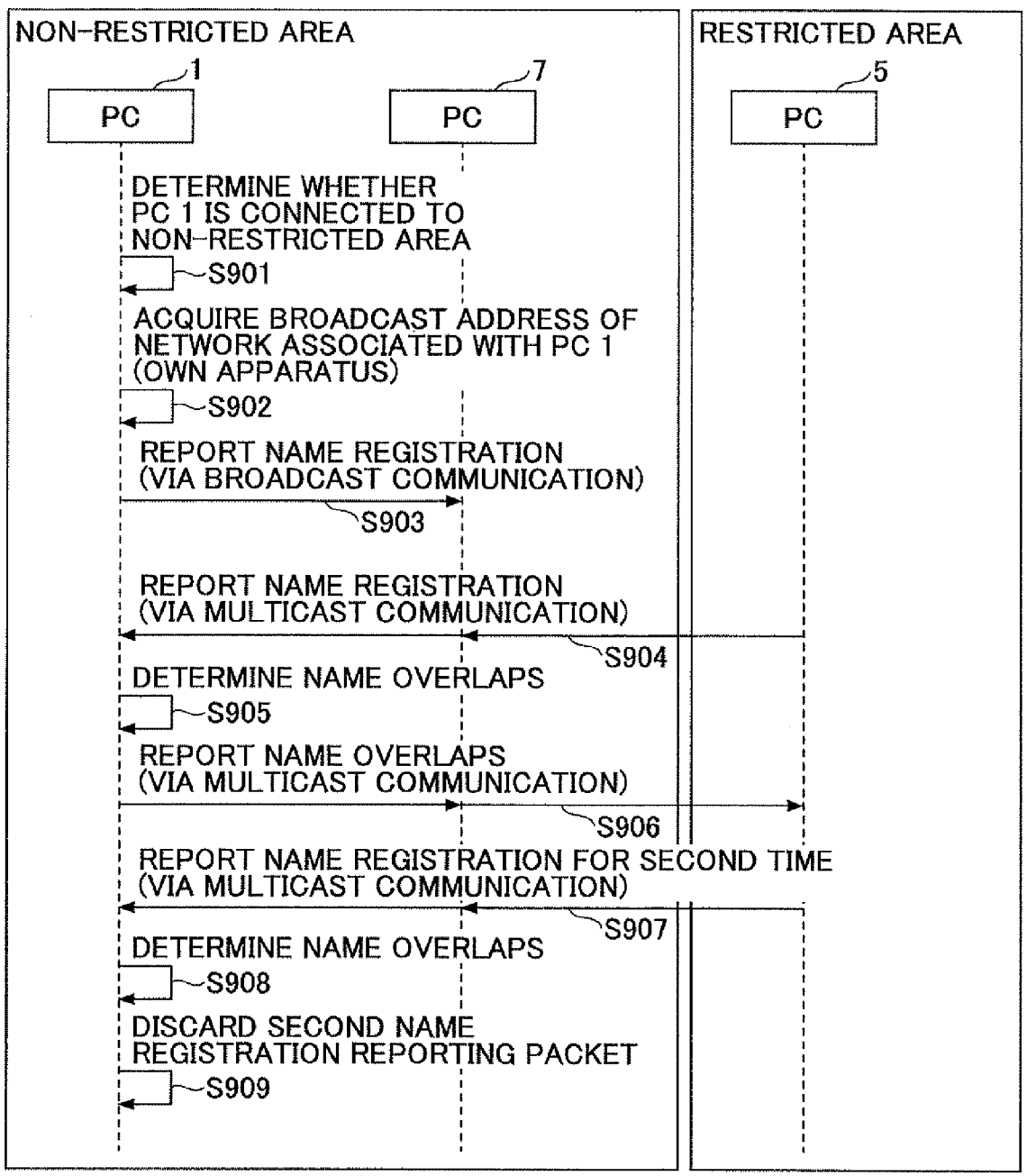
FIG. 9 is a sequence diagram illustrating still another example of the reporting process to report the apparatus own information over the network.

FIG. 9 is a sequence diagram illustrating an example of a reporting process to report apparatus own information over the network. As illustrated in FIG. 9, the PC 1 and PC 7 reside within the non-restricted area and the PC 5 resides within the restricted area. Note that an apparatus name of the PC 1 is defined as a "host A" and an apparatus name of the PC 5 is defined as a "host A" in the network configuration diagram in FIG. 6.

The PC 1 determines whether the PC 1 itself (own apparatus) is connected to the non-restricted area (step S901). In this case, since the PC 1 is logically connected to the non-restricted area, it is determined that the PC 1 is connected to the non-restricted area.

Figure 10:
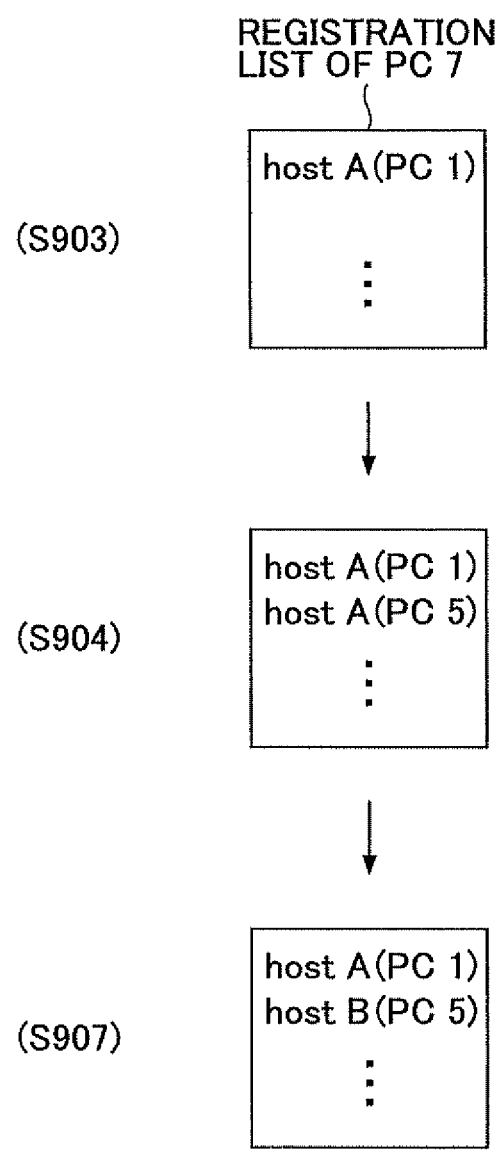
FIG. 10 is a diagram illustrating registration transitions of the registration list of the PC 7.

When the reporting section 112 of the PC 1 generates a reporting packet containing the apparatus own information of the PC 1, the communication section 113 of the PC 1 acquires a broadcast address of the network associated with the PC 1 (step S902) and sends the reporting packet containing name registration report or available service report via the broadcast communication (step S903). Note that the registration list of the related art PC 7 in step S903 is illustrated in FIG. 10 (see S903).

Next, the PC 5 reports the apparatus own information (e.g., name registration or available service). The PC 5 generates a reporting packet and sends the generated reporting packet containing a name registration report via the multicast communication in the same manner as the related art example (step 5904). Since the PC 5 sends the reporting packet via the multicast communication, the reporting packet reaches the PC 1 and PC 7 residing within the non-restricted area. Note that the registration list of the related art PC 7 in step S904 is illustrated in FIG. 10 (see S904). As illustrated FIG. 10, the registration list of the PC 7 includes overlapped names "host A" of the PC 1 and the PC 5.

In the first embodiment, the PC 1 subsequently receives the multicast communication packet (i.e., the reporting packet containing the name registration report sent via the multicast communication) from the PC 5 residing within the restricted area; however, in this modification, the PC 1 determines whether there is any apparatus having the name overlapped with the name of the PC 1. If an overlapped name is found, the PC 1 receives the multicast communication packet (step S905). If the name registration report (in the multicast communication packet) sent from the PC 5 is discarded in this step (step S905), the overlapped names "host A" of the PC 1 and the PC 5 remain in the registration list of the PC 7.

Thus, the communication section 113 of the PC 1 sends the reporting packet containing a name registration overlap report via the multicast communication (step S906). Subsequently, the PC 5 sends a second reporting packet containing a second name registration report (with changed name "host B") via the multicast communication (step S907). The PC 7 registers, on receiving the second reporting packet containing the second name registration report, the received second name registration report (i.e., "host B") in the registration list of the related art PC 7. Note that the registration list of the related art PC 7 in step S907 is illustrated in FIG. 10 (see S907). As illustrated FIG. 10, the overlapped names "host A" of the PC 1 and the PC 5 are canceled, and the name "host A" of PC 1 and the name "host B" of PC 5 are registered in the registration list of the PC 7.

Meanwhile, on receiving the second reporting packet containing the second name registration report, the PC 1 according to this modification determines whether there is any name of the apparatus overlapped with the name of own apparatus (i.e., PC 1) (step S908). Since there is no overlapped name found in this time, the PC 1 discards the received second reporting packet (step S909).

As described above, if the related art apparatus (e.g., PC 7) resides within the non-restricted area, such an apparatus sends the reporting packet or the searching packet via the multicast communication. That is, since the related art PC 7 discards the reporting packet or searching packet via the multicast communication, the overlapped names of the different apparatuses found one in each of the non-restricted area and the restricted area remain in the registration list of the related art PC 7. That is, the registration list of the related art PC 7 includes two "host A" registrations. Thus, in this modification, the PC 1 receives the name registration report via the multicast communication from an apparatus (i.e., the PC 5) residing within the restricted area and determines whether there is any apparatus having the name overlapped with the name of the PC 1. If an overlapped name is found, the PC 1 receives the multicast communication packet and sends the name overlap report via the multicast communication. With this configuration, since the apparatus (PC 5) changes the apparatus name of the PC 5 and sends the reporting packet containing the changed name for the second time from the restricted area, the overlapped names of the different apparatuses found over the network may be canceled. That is, it is possible to prevent the related art apparatus (PC7) from registering the overlapped names of the different apparatuses in the registration list of the related art apparatus (PC 7).

<Overview>

As described above, in the network configuration according to the embodiments, the network apparatus is capable of being connected to one of the restricted area where the communication is restricted and the non-restricted area where the communication is not restricted via a DHCP server and a network based on a DHCP address assigned by the DHCP server.

In the so-called quarantine network, the PCs having no security problem within the non-restricted area carry out search for/report apparatuses or available services via the multicast communication, and the PCs having the security problem within the restricted area may receive the multicast packet. That is, if the sender's address contained in the multicast packet is referred to, the IP addresses of the PCs having no security problem within the non-restricted area may be exposed (disclosed) to apparatuses within the restricted area.

According to an embodiment, there is provided a network apparatus that includes a communication unit configured to carryout communications including a broadcast communication and a multicast communication; and a reporting unit configured to generate a report containing apparatus own information of the network apparatus to be sent over the network. In the network apparatus, when the network apparatus is connected to the non-restricted area based on the DHCP address, the communication unit sends the report containing the apparatus own information of the network apparatus via the broadcast communication in place of the multicast communication.

With this configuration, since the network apparatus (e.g., the PC 1) according to the above-described embodiments residing within the non-restricted area sends a reporting packet containing apparatus information of the PC 1 via the broadcast communication in place of the multicast communication, the destination (destination of receiver) that receives the reporting packet is limited to be within the non-restricted area. Accordingly, the apparatus report and service report may be appropriately sent while utilizing effectiveness of the NAP DHCP and preventing the IP addresses or the like assigned to the non-restricted area from leaking. Similarly, the network apparatus (PC 1) according to the embodiments is configured to send a searching packet via the broadcast communication in place of the multicast communication so that the apparatus search and available service search may be appropriately carried out while utilizing the effectiveness of the NAP DHCP.

In another embodiment, when the network apparatus residing within the non-restricted area receives a reporting packet or searching packet via the broadcast communication, the network apparatus may discard the received reporting or searching packet based a destination area of the reporting packet or searching packet. With this configuration, the network apparatus is capable of limiting a destination to which a response to the received packet is to be sent.

Further, in another embodiment, when overlapped name registration is found while sending an apparatus report or service report, or searching for apparatus information or service information, the network apparatus residing within the non-restricted area is capable of cancelling the overlapped name registration by switching a communication method between the multicast communication and the broadcast communication, or by appropriately receiving or discarding the multicast communication packet. As a result, the effectiveness of the NAP DHCP may be obtained.

As described above, the aforementioned embodiments provide the network apparatus, the communication control method for controlling the network apparatus and the computer readable recording medium having a computer program for causing the network apparatus to execute the communication control method capable of carrying out an apparatus or service search, or an apparatus or service report in the quarantine network while utilizing the effectiveness of the NAP DHCP.

According to the embodiments described above, there are provided the network apparatus, the communication control method for controlling the network apparatus and the computer readable recording medium having a computer program for causing the network apparatus to execute the communication control method that are capable of carrying out an apparatus or service search, or an apparatus or service report in the quarantine network while utilizing the effectiveness of the NAP DHCP.

Note that the disclosed embodiments are not limited thereto, and various modifications and alterations maybe made within the scope of the inventions described in the claims. For example, the personal computers (PCs) described in the above embodiments may be applied to various kinds of network apparatuses, including mobile terminals or image forming apparatuses.

Note also that any arbitrary combinations, expressions, or rearrangement, as appropriate, of the aforementioned constituting elements and so forth applied to a method, a device, a system, a computer program, a recording medium, and the like are all effective as and encompassed by the embodiments and modifications of the present invention.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese priority Application No. 2009-280825 filed on Dec. 10, 2009, with the Japanese Patent Office, the entire contents of which are hereby incorporated by reference.

What is claimed is:

1. A network apparatus capable of being connected to one of a restricted area where a communication is restricted and a non-restricted area where a communication is not restricted via a DHCP server and a network, based on a DHCP address assigned by the DHCP server to the network apparatus, the network apparatus comprising a processing unit and a non-transitory computer readable medium embodying one or more programs of instructions executable by the processing unit to configure the processing unit to include:

a communication unit configured to determine, based on the DHCP address assigned by the DHCP server to the network apparatus, whether the network apparatus is connected to the non-restricted area or is connected to the restricted area, and carry out communications including a broadcast communication and a multicast communication; and a reporting unit configured to generate a report containing an apparatus own information of the network apparatus to be sent over the network, wherein in a case that the communication unit determines that the network apparatus is connected to the restricted area, the communication unit sends the report containing the apparatus own information of the network apparatus via the multicast communication, and in a case that the communication unit determines that the network apparatus is connected to the non-restricted area based on the DHCP address, the communication unit sends the report containing the apparatus own information of the network apparatus via the broadcast communication in place of the multicast communication.

2. The network apparatus as claimed in claim 1,
wherein, when the communication unit receives a multicast communication packet via the multicast communication from an apparatus residing within the restricted area, the communication unit discards the received multicast communication packet.

3. The network apparatus as claimed in claim 2, further comprising:
a determination unit configured to determine, on receiving an apparatus name registration report containing an apparatus name from the apparatus residing within the restricted area via the multicast communication, whether the apparatus name contained in the received apparatus name registration report overlaps an apparatus name of the network apparatus,
wherein, when the network apparatus is connected to the non-restricted area based on the DHCP address and another apparatus configured to carry out the multicast communication is connected to the non-restricted area, and when the determination unit determines that the apparatus name contained in the received apparatus name registration report overlaps the apparatus name of the network apparatus, the communication unit sends a name overlap report via the multicast communication in response to the received apparatus name registration report.

4. The network apparatus as claimed in claim 1,
wherein, when the communication unit receives from an apparatus a report indicating that there is apparatus information of the apparatus overlapped with the apparatus own information of the network apparatus after the report containing the apparatus own information of the network apparatus generated by the reporting unit is sent over the network, the communication unit sends another report containing a new apparatus own information of the network apparatus via the broadcast communication in place of the multicast communication.

5. The network apparatus as claimed in claim 1,
wherein, when the network apparatus is connected to the non-restricted area based on the DHCP address and an apparatus configured to carry out the multicast communication is connected to the non-restricted area, the communication unit sends the report containing the apparatus own information of the network apparatus via the multicast communication,
wherein, when the communication unit does not receive from the apparatus a report indicating that there is apparatus information of the apparatus overlapped with the apparatus own information of the network apparatus after the report containing the apparatus own information of the network apparatus generated by the reporting unit is sent over the network, the communication unit sends a deletion report to delete the apparatus own information of the network apparatus via the multicast communication, and wherein, when the communication unit receives from the apparatus the report indicating that there is apparatus information of the apparatus overlapped with the apparatus own information of the network apparatus after the report containing the apparatus own information of the network apparatus generated by the reporting unit is sent over the network, the communication unit sends the deletion report to delete the apparatus own information of the network apparatus via the multicast communication, and the communication unit further sends another report containing a new apparatus own information of the network apparatus via the broadcast communication.

6. A network apparatus capable of being connected to one of a restricted area where a communication is restricted and a non-restricted area where a communication is not restricted via a DHCP server and a network based on a DHCP address assigned by the DHCP server, the network apparatus comprising a processing unit and a non-transitory computer readable medium embodying one or more programs of instructions executable by the processing unit to configure the processing unit to include:
a communication unit configured to determine, based on the DHCP address assigned by the DHCP server to the network apparatus, whether the network apparatus is connected to the non-restricted area or is connected to the restricted area, and carry out communications including a broadcast communication and a multicast communication; and
a searching unit configured to search for an apparatus information of an apparatus connected over the network, wherein
in a case that the communication unit determines that the network apparatus is connected to the restricted area, the communication unit sends a report containing the apparatus own information of the network apparatus via the multicast communication, and
in a case that the communication unit determines that the network apparatus is connected to the non-restricted area based on the DHCP address, the communication unit causes the searching unit to carry out the search for the apparatus information of the apparatus connected over the network via the broadcast communication in place of the multicast communication.

7. The network apparatus as claimed in claim 6,
wherein, when the communication unit receives a multicast communication packet via the multicast communication from an apparatus residing within the restricted area, the communication unit discards the received multicast communication packet.

8. A method for controlling a communication of a network apparatus capable of being connected to one of a restricted area where a communication is restricted and a non-restricted area where a communication is not restricted via a DHCP server and a network based on a DHCP address assigned by the DHCP server, the method comprising:
(a) determining by the network apparatus based on the DHCP address assigned to the network apparatus whether the network apparatus is connected to the non-restricted area or is connected to the restricted area;
(b) carrying out communications including a broadcast communication and a multicast communication; and
(c) generating a report containing an apparatus own information of the network apparatus to be sent over the network, wherein
in a case that the network apparatus determines in (a) that the network apparatus is connected to the restricted area, the network apparatus sends the report containing the apparatus own information of the network apparatus via the multicast communication, and in a case that the network apparatus determines in (a) that the network apparatus is connected to the non-restricted area based on the DHCP address, the report containing the apparatus own information of the network apparatus is sent via the broadcast communication in place of the multicast communication.

9. The method as claimed in claim 8, wherein the method is performed by the network apparatus executing a computer program stored in a non-transitory computer-readable recording medium.

\* \* \* \* \*